(12) United States Patent
Goodwin

(10) Patent No.: US 9,139,484 B2
(45) Date of Patent: Sep. 22, 2015

(54) FOLIAR METAL ION NUTRIENT FERTILIZER

(71) Applicant: Compass Minerals Manitoba, Inc., Winnipeg (CA)

(72) Inventor: Mark Goodwin, Winnipeg (CA)

(73) Assignee: Compass Minerals Manitoba, Inc., Overland Park, KS (US)

( * ) Notice: Subject to any disclaimer, the term of this patent is extended or adjusted under 35 U.S.C. 154(b) by 0 days.

(21) Appl. No.: 14/461,563

(22) Filed: Aug. 18, 2014

(65) Prior Publication Data

US 2014/0366597 A1    Dec. 18, 2014

Related U.S. Application Data

(63) Continuation-in-part of application No. PCT/CA2014/005013, filed on Feb. 14, 2014.

(60) Provisional application No. 61/766,257, filed on Feb. 19, 2013.

(51) Int. Cl.
| | |
|---|---|
| *C05D 9/02* | (2006.01) |
| *C05G 3/06* | (2006.01) |
| *C05C 9/00* | (2006.01) |
| *C05G 3/00* | (2006.01) |

(52) U.S. Cl.
CPC ... *C05G 3/06* (2013.01); *C05C 9/00* (2013.01); *C05C 9/005* (2013.01); *C05G 3/0064* (2013.01)

(58) Field of Classification Search
CPC ............... C05G 3/06; C05C 9/00; C05D 9/02
USPC .............................................. 71/11–63
See application file for complete search history.

(56) References Cited

U.S. PATENT DOCUMENTS

| | | | | |
|---|---|---|---|---|
| 3,640,698 | A * | 2/1972 | Backlund | 71/29 |
| 4,219,348 | A * | 8/1980 | Parham et al. | 71/30 |
| 5,019,149 | A * | 5/1991 | Hawkins et al. | 71/29 |
| 6,241,795 | B1 * | 6/2001 | Svec et al. | 71/11 |
| 8,568,505 | B2 * | 10/2013 | Wells | 71/23 |
| 2006/0030490 | A1 * | 2/2006 | Hayashi et al. | 504/353 |
| 2008/0307845 | A1 * | 12/2008 | Marks | 71/28 |
| 2012/0312059 | A1 * | 12/2012 | Killick et al. | 71/23 |

* cited by examiner

*Primary Examiner* — Wayne Langel
(74) *Attorney, Agent, or Firm* — McKee, Voorhees & Sease, PLC

(57) ABSTRACT

The uptake of foliar-applied metal ion nutrients, for example, zinc, iron, magnesium and copper, is influenced by humidity. Specifically, uptake is negatively impacted if the zinc is applied under low humidity, as the metal ion is "locked up" by leaf waxes as the droplet dries on the surface of the leaf, thereby rendering the metal ion useless. Described herein is a foliar metal ion fertilizer comprising (a) a metal ion sulphate in combination with a mixture of (b) urea and (c) a substance with a suitable point of deliquescence (POD) such as organic surfactants, calcium chloride, magnesium chloride or combinations thereof.

16 Claims, 10 Drawing Sheets

FOLIAR METAL ION NUTRIENT FERTILIZER

PRIOR APPLICATION INFORMATION

The instant application is a continuation-in-part application of Patent Cooperation Treaty Application PCT/CA2014/050103, filed internationally on Feb. 14, 2014 which claims the benefit of U.S. Provisional Patent Application 61/766,257, filed Feb. 19, 2013.

FIELD OF THE INVENTION

The present invention relates generally to the field of fertilizers. More specifically, the present invention relates to foliar fertilizers having increased uptake and transportation of metal ion nutrients, specifically zinc, iron, copper and magnesium, through the plant.

BACKGROUND OF THE INVENTION

Crop response to foliar applied metal ion nutrients in the field is an extremely complex process. Efficacy depends on the nutrient status of the plant, the species in question and the timing of application and environmental factors. Many crops have a high need for metal ion nutrients such as zinc, iron, copper and magnesium but an accompanying inability to move these nutrients from the point at which foliar applied metal ion nutrients hit the leaf, to points through the crop where the metal ion nutrients are needed. For instance, almonds have a high zinc requirement but less than 3 percent of foliar applied zinc actually moves from point of interception to sites within the crop where the zinc can be effectively used.

As will be readily apparent to those of skill in the art, there are two challenges in attaining efficacy with foliar applied metal ion nutrients. These two challenges are: attaining penetration through epicuticular wax and movement of the nutrients from the leaf to other parts of the plant that require the nutrient.

Published US Patent Application 2012/0312059 teaches a liquid foliar nutrient which comprises 5-80% by weight of oil selected from mineral oils, vegetable oils, esters of fatty acids, aliphatic alcohols and mixtures thereof together with a surfactant and an essential element, selected from Fe, Mn, B, Cu, Mo, Co, Ni, Zn, Ca, Mg, Si, Se and mixtures thereof. In some embodiments, acidifiers and coupling agents are added. Examples provided for suitable acidifiers include lactic acid, propionic acid and citric acid. Examples of suitable coupling agents provided include alcohols, amines, alkylcarbonates, glycols and glycol ethers such as glycerine, dipropylene glycol, urea, ammonium acetate, aqueous ammonia and dipropylene glycol monomethyl ether. As discussed herein, it is believed that many of these optional additives may form complexes with the metals and prevent or hinder dispersion of the metals to the rest of the plant.

Chinese patent application CN101983954.09 describes an anti-virus composite nutrient solution which is prepared by mixing 2 separate solutions together. Solution A consists of Potassium sulfate 10 g, seven magnesium sulfate heptahydrate 30 grams, phosphoric anhydride 5 grams, boric acid 1 g, a water manganese sulfate 0.2 g, heptahydrate zinc sulphate 0.2 g, five water copper sulfate 0.2 g, ferrous sulphate heptahydrate 3 grams, molybdenum trisulfate 0.1 g, vitamin C 0.3 grams. Solution B consists of Calcium chloride 43 g, six water magnesium chloride 4.7 g and urea 2.3 grams.

Neither of these references deal with enhancing uptake of metal ion sulfates by a two part mechanism using a POD adjusting compound to prevent "lock up" by leaf wax and a urea transport enhancer to assist in moving metal ions through the plant to maximize nutrient enhancement from the available metal ions.

SUMMARY OF THE INVENTION

According to an aspect of the invention, there is provided a foliar metal ion nutrient fertilizer, comprising:
a metal ion sulphate nutrient wherein the metal ion is selected from the group consisting of zinc, iron, copper and magnesium;
from about 0.25% to about 25% (v/v) of urea transport enhancer; and
from about 0.1% to about 2.5% (v/v) of a POD adjuster selected from the group consisting of organic surfactants, calcium chloride and magnesium chloride.

The amount of urea transport enhancer may be from about 0.5% to about 2.5% (v/v).

The amount of POD adjuster may be from about 0.5% to 1.5% (v/v).

The organic surfactants may be non-ionic surfactants, for example, selected from the group consisting of alkyl naphthalene sulfonates, ethoxylated alcohols, nonyl phenoxy polyethoxy ethanol, and amine alkoxylate.

The POD adjuster may have a POD of 40 or below.

According to a further aspect of the invention, there is provided a method of enhancing metal ion uptake in a plant in need thereof comprising:
applying a foliar metal ion nutrient fertilizer wherein the metal ion nutrient is selected from the group consisting of zinc sulphate, iron sulphate, copper sulfate and magnesium sulphate in combination with urea at from about 0.25% to about 25% (v/v) and a point of deliquescence (POD) adjusting compound with a suitable POD at from about 0.1% to about 2.5% (v/v); and
growing the plant under conditions for promoting growth of said plant.

The POD adjusting compound may be selected from the group consisting of organic surfactants, calcium chloride and magnesium chloride.

The suitable POD adjusting compound may have a point of deliquescence below an average ambient humidity for the region of application.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As discussed herein, the inventor has made the surprising discovery that the uptake of foliar-applied metal ion nutrients, for example, although by no means limited to zinc, magnesium, iron and copper, is influenced by humidity. Specifically, uptake is negatively impacted if the metal ion nutrient is applied under low humidity, that is, a humidity level that is above the point of deliquescence (POD) for the metal ion nutrient, as the nutrient is "locked up" by leaf waxes as the droplet of the foliar-applied nutrient fertilizer dries on the surface of the leaf, thereby rendering the metal ion nutrient useless as it cannot be internalized by the plant.

As will be appreciated by one of skill in the art, other suitable metal ions which are necessary for plant nutrition may be used within the invention, for example, manganese.

Furthermore, the metal ions may be in any suitable form for uptake by the plants, for example, sulphates, oxides, nitrates, phosphates, chlorides and the like. In the examples, metal ion sulphates are used.

Specifically, wax hinders the penetration of water and nutrients across the membrane. Various aspects of foliar nutrition with different inorganic salts have been studied but only a few examine cuticular penetration of ions and salts. Some work shows that with increasing humidity, rate of penetration increased because cuticles swelled. However, humidity's main effect was related to dissolution of salt residues on the surface of cuticles. Penetration requires dissolution of the nutrient salt. This is determined by the point of deliquescence (POD) of the salt relative to humidity over the salt residue. POD is defined as that humidity over a saturated solution containing solid salt. When humidity is above the POD, the salt residue on the cuticle will dissolve. When humidity is below the POD, a solid residue is formed and penetration ceases. Work at UC Davis and other places has determined that the lower the POD, the better the penetration. For example, Lithium Chloride has a POD of 11.3%, Sodium Bromide has a POD of 58%, Sodium Chloride has a POD of 75%, KCl has a POD of 85%, Potassium Nitrate has a POD Of 94%, $CaCl_2$ has a POD of 33%, $MgCl_2$ has a POD of 33%, $K_2CO_3$ has a POD of 56%, $Mg(NO_3)_2$ has a POD of 56% and $ZnSO_4$ has a POD of approximately 90%. Furthermore, the point of deliquescence can be determined for any compound by determining the relative humidity at which the material starts absorbing available moisture.

Regarding the transportation of the nutrient throughout the plant, many workers have tested various additives and plant hormones combined with nutrients such as zinc were tested to determine if the amount of for example zinc that entered the plant could be more effectively moved from the point of entry through to other growing tissue within the plant.

One oft-cited means of hastening transport is through the addition of urea to mixes of foliar zinc. Some researchers cited enhanced movement through the plant of the zinc when urea was added to the spray mix. L. J. Grauke (1982) found The inclusion of $NH_4NO_3$ and urea to either $Zn(NO_3)_2$ or $ZnSO_4$ resulted in a significant increase in translocation of absorbed zinc. (The Influence of Zinc Carriers on the Foliar Absorption of Zinc by Pecan and Corn. Ph. D. Dissertation, Texas A&M University, College Station, Tex., 1982). Others attained diametrically opposite results with the addition of urea doing absolutely no good in enhancing zinc movement. Haslett et al (2001) showed no impact in terms of increased shoot growth vs zinc alone on wheat. (from Haslett, B S, Reid R. J. and Rengel Z in Annals of Botany 87:379-386 "Zinc Mobility in Wheat: Uptake and Distribution of Zinc Applied to Leaves or Roots".

None of these researchers identified humidity management as a central reason as to why the differences in the efficacy of the urea occurred. The average humidity at College Station (where the urea worked) exceeds 94 percent by early July three days out of every four. The average humidity at the research facilities where the urea did NOT work was low. At the University of Western Australia (Haslett), humidity is below 50% on average (1942 to 1992 average).

While not wishing to be bound to a particular theory or hypothesis, the inventor believes that in instances where the urea was not effective in enhancing transportation, the process was stopped because initial transport across the leaf was impeded by low humidity accompanied by the lack of appropriate POD additives. As will be readily apparent to one of skill in the art, urea cannot transport nutrients through a plant if the nutrients are stopped by the leaf wax before the nutrients even enter the plant. Thus, the presence of a POD adjuster compound in the foliar fertilizer helps keep the droplet of the foliar fertilizer applied to the leaf "wet" for longer, that is, prevents the metal ion sulphate from precipitating out of solution and becoming deposited on the leaf.

Described herein is a foliar fertilizer comprising two additional ingredients that will (a) enhance metal ion nutrient uptake and (b) enhance movement through the plant. By including both additives, one can consistently take advantage of the capacity of the urea to enhance translocation of the metal ion nutrient.

As discussed herein, two additives are combined with the metal ion nutrients, with the first additive (designated as POD Adjuster or PODAdj) is designed to decrease the POD and the second additive (designated as transport enhancer or TrEnh) is designed to drive transport of the zinc throughout the plant.

As will be appreciated by one of skill in the art, any suitable POD compound can be used provided that the resulting POD is lower than the relative (environmental) humidity at the time of application and uptake to/by the plant.

The POD adjuster may be any compound that decreases the POD of $ZnSO_4$, (POD 90) $MgSO_4$ (POD 90), $CuSO_4$ (POD 90) or $FeSO_4$ (POD 90), for example, although by no means limited to, a suitable organic surfactant, calcium chloride or magnesium chloride.

While not wishing to be bound to a particular theory or hypothesis, the inventor believes that the POD adjuster keeps the composition "wet" so that the leaf wax does not lock up the nutrient solution, and this allows for penetration of the metal ion nutrient/urea through the epicuticular wax. The area then acts to enhance distribution of the metal ion nutrient, moving the metal ion nutrient away from the leaves and further within the plant, which in turn allows more metal ion nutrient to be taken up.

The suitable organic surfactant may be selected from the group consisting of: an alkylnaphthalene sulfonate surfactant (MORWET®), an alcohol ethoxylated surfactant (AGNIQUE®), nonylphenoxy polyethyoxyethanol (Agral™ 90), formulated amine alkoxylate (ADSEE907™) as well as other suitable non-ionic surfactants known in the art. These all have the commonality of having lower POD's—such that maintenance of solubility across a key range of relative humidities (20 percent and up) is better than that of zinc sulphate alone.

Figure 10:
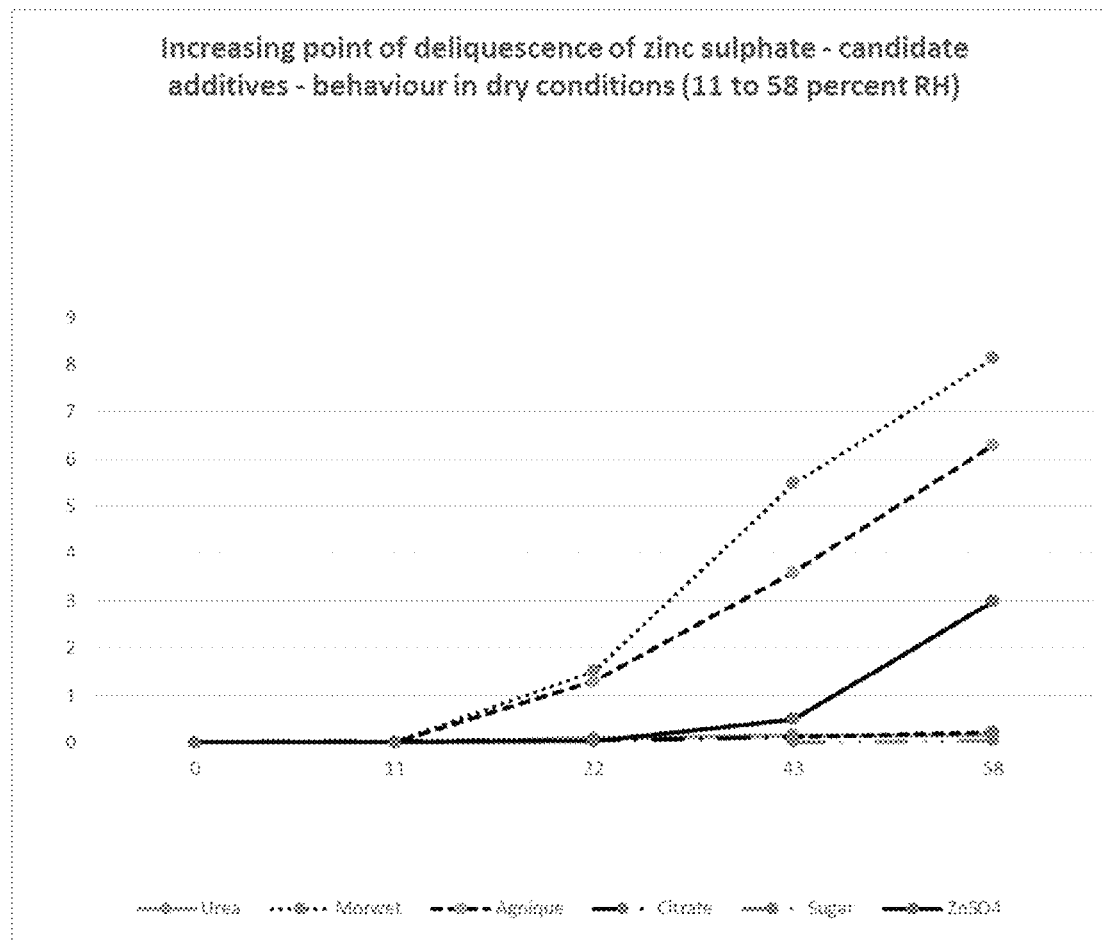
FIG. 10 is a graph showing the effect of urea, Morwet®, Agnique®, citrate and sugar on altering the point of deliquescence of zinc sulphate under dry conditions (11-58% relative humidity).

As can be seen from FIG. 10, the addition of citrate, sugar and urea in fact lowers the solubility of zinc sulphate, which is consistent with the data shown in some of the examples discussed below. However, the organic surfactants Morwet® and Agnique® increase the solubility of the zinc sulphate under the dry conditions so that the zinc sulphate has solubility at 22% relative humidity and much greater solubility at 43% and 58% relative humidity compared to zinc sulphate alone which shows no solubility at 22% relative humidity and only slight solubility at 43% relative humidity. As discussed above, the addition of urea, citrate and sugar in fact lowers the solubility of zinc sulphate such that there is no solubility even at 58% relative humidity.

The transport enhancer may be any suitable compound which will enhance translocation of the metal ion nutrient throughout the plant. Suitable examples of transport enhancers include but are by no means limited to urea and it's like compounds such as ammonium nitrate.

The foliar metal ion nutrient fertilizer comprises (a) a high analysis of a sulphate form of the nutrient (up to 98%), (b) a POD altering agent or compound at 0.2 to 2.0%, of the fertilizer selected from (i) an additive with hydroscopic properties and/or (ii) an anhydrous low molecular weight acid such as, magnesium chloride, calcium chloride, and the like; and (c) a transport enhancer, for example, urea or a like compound, for example but by no means limited to ammonium nitrate.

The foliar metal ion fertilizer comprises (a) a high analysis of a metal ion sulphate (up to about 99.6% metal ion sulphate, for example about 73 to about 99.6%, about 73.5 to about 99.6%, about 74 to about 99.6%, about 74.5 to about 99.6%, about 78.5 to about 99.6%, about 79.5 to about 99.6%, about 73 to about 99%, about 73.5 to about 99%, about 74 to about 99%, about 74.5 to about 99%, about 78.5 to about 99%, about 79.5 to about 99%, about 73 to about 98%, about 73.5 to about 98%, about 74 to about 98%, about 74.5 to about 98%, about 78.5 to about 98%, about 79.5 to about 98%, about 73 to about 97%, about 73.5 to about 97%, about 74 to about 97%, about 74.5 to about 97%, about 78.5 to about 97%, or about 79.5 to about 97%,), (b) a POD altering agent or compound at about 0.1 to about 2.5%, about 0.2 to about 2.5%, about 0.1 to about 2.0%, about 0.2 to about 2.0%, about 0.5 to about 2.5%, about 0.5 to about 2.0% or about 0.5 to about 1.5% of the fertilizer selected from (i) an additive with hydroscopic properties such as an organic surfactant and/or (ii) an anhydrous low molecular weight acids such as magnesium chloride, calcium chloride, and the like; and (c) a transport enhancer, for example, urea at about 0.2 to about 25% (v/v), about 0.2 to about 20%, about 0.2 to about 15%, about 0.2 to about 10%, about 0.2 to about 5%, about 0.2 to about 2%, about 0.5 to about 25%, about 0.5 to about 20%, about 0.5 to about 10%, about 0.5 to about 5.0%, about 0.5 to about 2%, about 2.5 to about 25%, about 2.5 to about 20%, about 2.5 to about 15%, about 2.5 to about 10%, about 5% to about 25%, about 5% to about 20% or about 15% to about 25%.

As will be appreciated by one of skill in the art and as discussed herein, the amount of urea required for translocation may depend on a number of factors, for example, on the metal ion to be transported; the plant to which the foliar metal ion fertilizer is being applied; and the growth conditions that the plant is exposed to.

The foliar metal ion fertilizer is intended for application to any suitable agricultural crop in need of enhanced metal ion uptake, including but by no means limited to horticultural crops, field crops, fruit trees, nut trees and ornamentals.

As discussed herein, the invention comprises a "two step" combination wherein the PODAdj (POD altering element) works at the interception phase as the nutrient droplet strikes the leaf, acting to keep that droplet wet during the time the urea/metal ion are passing through the leaf wax. The TrEnh (transport enhancer) then acts to facilitate movement of the metal ion through the plant, having benefited from the maximized plant entry conferred on the solution by the POD agent.

In a preferred embodiment, the foliar metal ion fertilizer comprises (a) metal ion sulphate in combination with a mixture of (b) urea at 0.2 to 25% and (c) a substance with a POD below 40 such as organic surfactants, calcium chloride, magnesium chloride or combinations thereof, as discussed above.

In a preferred embodiment, 0.1-2.5% POD adjuster (v/v) and 0.2-25.0% urea (v/v) are added to $ZnSO_4$, $CuSO_4$, $MgSO_4$, and $FeSO_4$.

It is of note that addition of excess POD adjuster compounds can have a detrimental effect on the process by which the foliar fertilizer is applied to and taken up by the plant. Specifically, excess POD adjuster, for example, organic surfactants can result in the contact angle of the droplet of the foliar fertilizer to the leaf becoming too flat, such that the droplet is not taken up by the leaf.

In one embodiment of the invention, there is provided a foliar zinc fertilizer comprising an effective amount of zinc sulphate in combination with urea at about 0.5 to 25% (v/v) and a substance with a POD below the average ambient humidity at about 0.1 to 2.5%. In some embodiments, the urea may be at about 0.5 to 20%, about 0.5 to 10%, about 0.5-5.0% or about 0.5 to 2% (v/v).

In one embodiment of the invention, there is provided a foliar magnesium fertilizer comprising an effective amount of magnesium sulphate in combination with urea at about 0.5 to 25% (v/v) and a substance with a POD below the average ambient humidity at about 0.1 to 2.5%. In some embodiments, the urea may be at about 0.5 to 20%, about 0.5 to 10%, about 0.5-5.0% or about 0.5 to 2% (v/v).

In one embodiment of the invention, there is provided a foliar iron fertilizer comprising an effective amount of iron sulphate in combination with urea at about 0.5 to 25% (v/v) and a substance with a POD below the average ambient humidity at about 0.2 to 2.0%. In some embodiments, the urea may be at 15 to 25% (v/v).

In one embodiment of the invention, there is provided a foliar copper fertilizer comprising an effective amount of copper sulphate in combination with urea at about 0.5 to 25% (v/v) and a substance with a POD below the average ambient humidity at about 0.2 to 2.0%. In some embodiments, the urea may be at about 0.5 to 20%.

As will be appreciated by one of skill in the art, the average ambient humidity for a given region or area can be easily determined, calculated or estimated using data available through any of a variety of weather services or web sites.

The POD below the average ambient humidity may be for example, 40%. That is, the POD adjuster may have a POD value of about less than 40.

As will be known to one of skill in the art and as discussed above, the PODs for a large number of compounds suitable for use within the invention are well known as are methods for determining the POD of potential POD adjusters. However, some examples of suitable POD adjusters include but are by no means limited to organic surfactants, calcium chloride, magnesium chloride or combinations thereof, as discussed above.

As will be appreciated by one of skill in the art, the above-described foliar metal ion fertilizer is taken up at a much higher rate than conventional foliar metal ion fertilizers. Accordingly, in some embodiments of the invention, the above-described foliar zinc fertilizer can be applied at a rate that is for example 40% or less than traditional zinc fertilizers. Alternatively, a similar rate may be used so that higher levels, for example, 40% or more zinc, is taken up, compared to a similar foliar zinc fertilizer known in the art.

The foliar metal ion nutrient fertilizers, for example, magnesium sulphate fertilizer, zinc sulphate fertilizer, copper sulphate fertilizer and iron sulphate fertilizer, may, in general, be used in the following manner.

Fruit trees/nuts—up to 1.5 kg per ha of product. Use of the PODAdj/TrEnh technology would be such that up to 1.5 kg per ha of the product be sprayed.

Annual crops—up to 0.45 kg per ha kg per ha of product. Use of the POD/TrEnh technology would be such that up to 0.45 kg per ha of the product be sprayed.

The invention will now be further explained by way of examples; however, the invention is not necessarily limited to or by the examples.

In all of the examples, the average relative humidity was approximately 30 to 70%.

Figure 1:
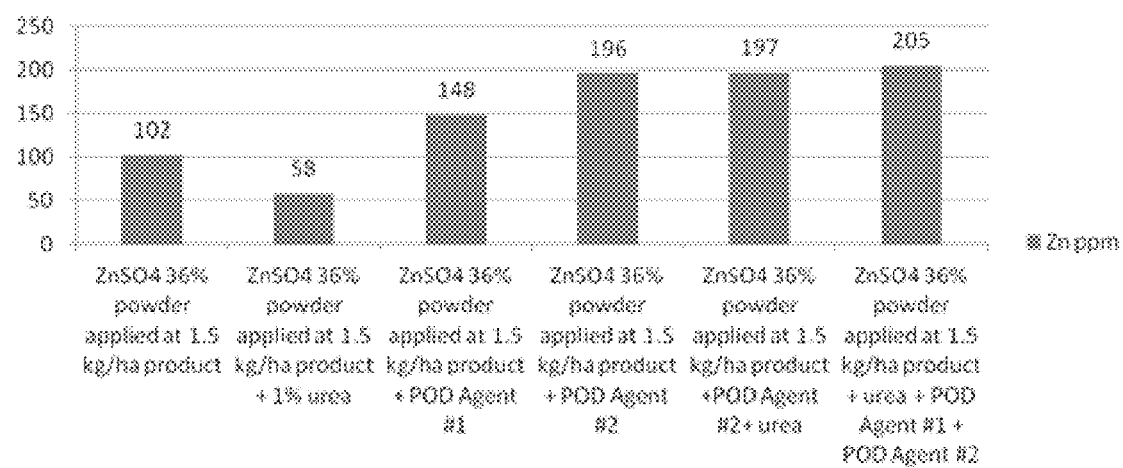
FIG. 1 is a bar graph showing results from zinc sulphate transportation to untreated leaf tissue when applied on terminal ends of branches of apple trees.

As shown in FIG. 1, zinc foliar treatments were applied to the leaves of apple trees. The ends of branches were covered so that the leaves thereon did not receive any zinc foliar spray. The relative humidity was 50 percent on the day of spraying. The sprays were applied in approximately 400 L per hectare rates. There were three trees per treatment and the uptake and movement of zinc was measured 7 days after treatment.

$ZnSO_4$ was applied at 1.5 kg/ha in all treatment groups. In treatment group 1, zinc powder alone was applied and 102 ppm was taken up. In treatment group 2, $ZnSO_4$ was applied together with 1% urea. As can be seen, zinc uptake was in fact reduced significantly (almost 50% compared to column 1, specifically 58 ppm compared to 102 ppm) compared to treatment group 1. In treatment group 3, POD agent #1, an alkylnaphthalene sulfonate surfactant (MORWET®), was added at 1% and zinc uptake increased by almost 50% to 148 ppm. In treatment group #4, POD agent #2, an alcohol ethoxylated surfactant (AGNIQUE®) was added at 1% and zinc uptake increased almost 100% compared to treatment group 1, to 196 ppm. In treatment group 5, urea and POD agent #2 were added. As can be seen in comparison with treatment group 2, addition of the POD agent #2 counteracted the negative impact of the addition of 1% urea on zinc uptake such that not only was zinc uptake increased by almost 100% compared to zinc alone (197 ppm in treatment group 5 compared to 102 ppm in treatment group 1), zinc uptake was increased almost 300% compared to zinc and urea (197 ppm in treatment group 5 compared to 58 ppm in treatment group 2). In treatment group 6, both POD agents #1 and #2 and urea were added which resulted in a slightly higher zinc uptake (205 ppm) than treatment groups 3 (148 ppm) and 4 (196 ppm), indicating an additive effect.

Thus, as discussed above, the urea, when added to the zinc did not improve the translocation of zinc to the unsprayed leaves—as per the result by Haslett et al. But when the urea was added in concert with substances with points of deliquescence below the relative humidity, the urea was able to enhance translocation in a manner equal to that seen by L. J. Grauke (1982), discussed above.

It is important to remember that this data relates to the levels of zinc in untreated terminal portions of the branches. Thus, the foliar zinc fertilizer is clearly being transported or distributed from the treated leaf tissue portions of the branch to the covered, terminal areas of the branches.

Example 2

$ZnSO_4$ Uptake in Lettuce

Figure 2:
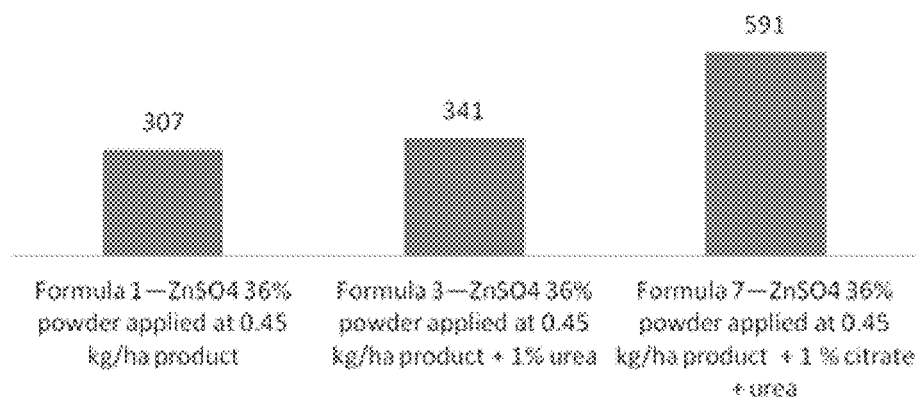
FIG. 2 is a bar graph showing results from zinc sulphate uptake efficacy experiments carried out in lettuce.

Regarding FIG. 2, in all treatment groups, 36% $ZnSO_4$ was applied at 0.45 kg/ha.

In treatment group 1, zinc alone was applied and 307 ppm zinc was taken up by the lettuce. In treatment group 2, 1% urea was added and uptake of zinc improved slightly to 341 ppm. It is important to note that unlike the previous example, urea did not inhibit uptake and in fact appears to have slightly enhanced zinc uptake. In the third treatment group, 1% citrate was added along with 1% urea and zinc uptake increased almost 100% to 591 ppm.

Thus, in this example, citrate acted as a POD adjuster and did not interfere with translocation of the zinc throughout the plant.

The following set of experiments were conducted in a greenhouse in Winnipeg MB. All crops were grown in 15 cm pots.

After the plants had been in the greenhouse for a minimum of 10 days, leaves were marked with a felt ("Sharpie") pen. The marked leaves were dipped into a 500 mL solution of one of a number of solution mixtures—some solutions using an alkylnaphthalene sulfonate surfactant (MORWET®), a product with a POD profile that is significantly lower than sulphate forms of micronutrient and enhances solubility under dry conditions as discussed above and as shown in FIG. 10—some solutions using urea as a translocator and some solutions using both or neither. One of Magnesium, iron or copper (all in sulphate form) were present in the solution at a concentration at or near 1 mole per liter of the metal element.

At approximately 10 to 14 days after application, uptake into the DIPPED portions of leaves was measured by clipping the dipped portion of the leaf off the plant and sending the dipped portion off for tissue testing. The UNDIPPED (basipetal) half of the leaf was also clipped and the amount of nutrient that crossed the "Sharpie Line" was measured to get a measurement of whether the urea (translocator) was doing its job. In some trials, we also measured the "rest of plant" as well.

Example 3

Magnesium Sulphate Uptake in Treated Leaves of Peppers

In this example, the ability of a POD enhancer, an alkylnaphthalene sulfonate surfactant (MORWET®), to increase uptake of a nutrient into the interior of a pepper leaf was examined.

Pepper plants were grown in pots in a greenhouse. When they were approximately 6 inches high, the newest 2 to 3 fully expanded leaves were marked at right angles to the midvein with a felt pen. The tips were immersed for 5 seconds in a solution containing $MgSO_4 \cdot 7H_2O$ (24.65 g) or in a solution comprising $MgSO_4 \cdot 7H_2O$ plus an agent that will lengthen the amount of time that the composition stays wet on the leaf surface. In this case, 0.5 g Morwet was added. At 7 days after immersion, the tissues were clipped at the felt tip pen line and the tissue that had been immersed was measured for uptake of magnesium into the leaf tissue.

Figure 3:
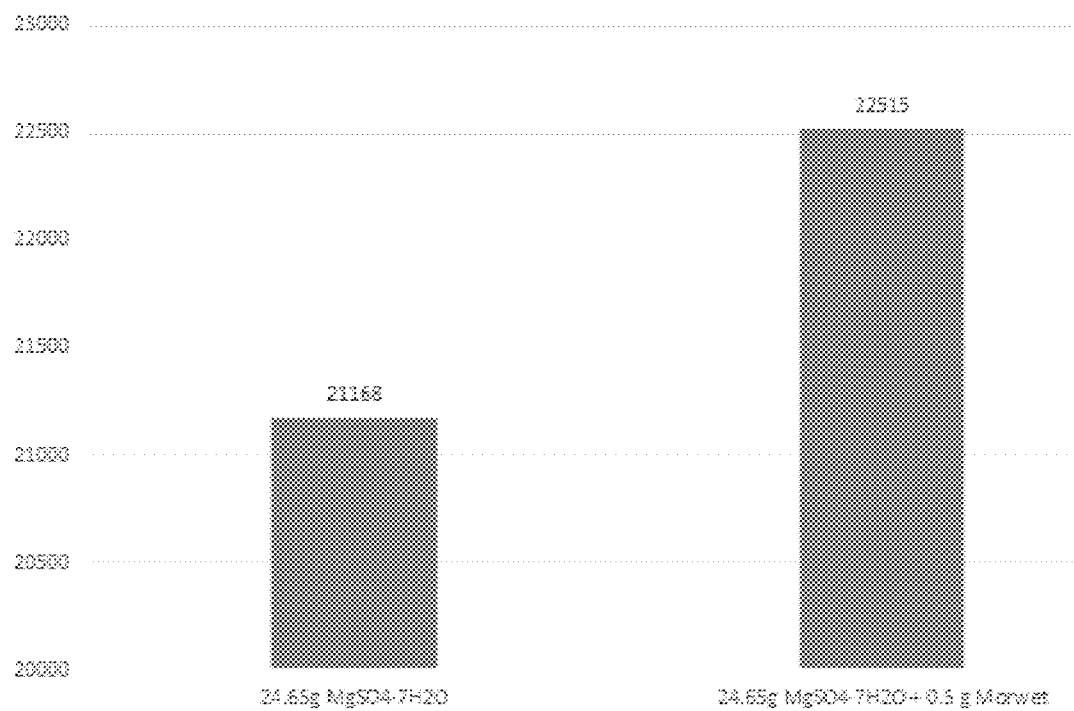
FIG. 3 is a bar graph showing the effect of the addition of a PODadj compound on magnesium sulphate uptake into pepper leaves.

As can be seen in FIG. 3, addition of a PODadj compound, an alkylnaphthalene sulfonate surfactant (MORWET®), increased uptake of magnesium from 21168 ppm (column 1) to 22515 ppm (column 2). This demonstrates that adding a POD adjuster or enhancer increases the amount of uptake of magnesium into the leaf tissue that has been treated compared to a leaf supplied only the $MgSO_4$.

Example 4

Magnesium Sulphate Uptake into Untreated Portions of Peppers

In this example, the ability of a POD enhancer, an alkylnaphthalene sulfonate surfactant (MORWET®), in combination with a "translocator" (urea) in increasing the levels of Mg in untreated portion of a leaf was tested.

Pepper plants were grown in pots in a greenhouse. When they were approximately 6 inches high, the newest 2 to 3 fully expanded leaves were marked at right angles to the midvein with a felt pen. The tips were immersed for 5 seconds in a solution containing $MgSO_4 \cdot 7H_2O$ (24.65 g) plus various combinations of agents that will (a) lengthen the amount of time that the solution stays wet on the leaf surface or (b) assist in moving the magnesium out of the dipped tissue area and into new growth. At 7 days after immersion, tissue that had grown after the plant had been exposed to the solution was clipped to see if the combination of using urea as a translocator plus an alkylnaphthalene sulfonate surfactant (MORWET®) as a POD modifier would aid in exporting the magnesium to new growth.

Figure 4:
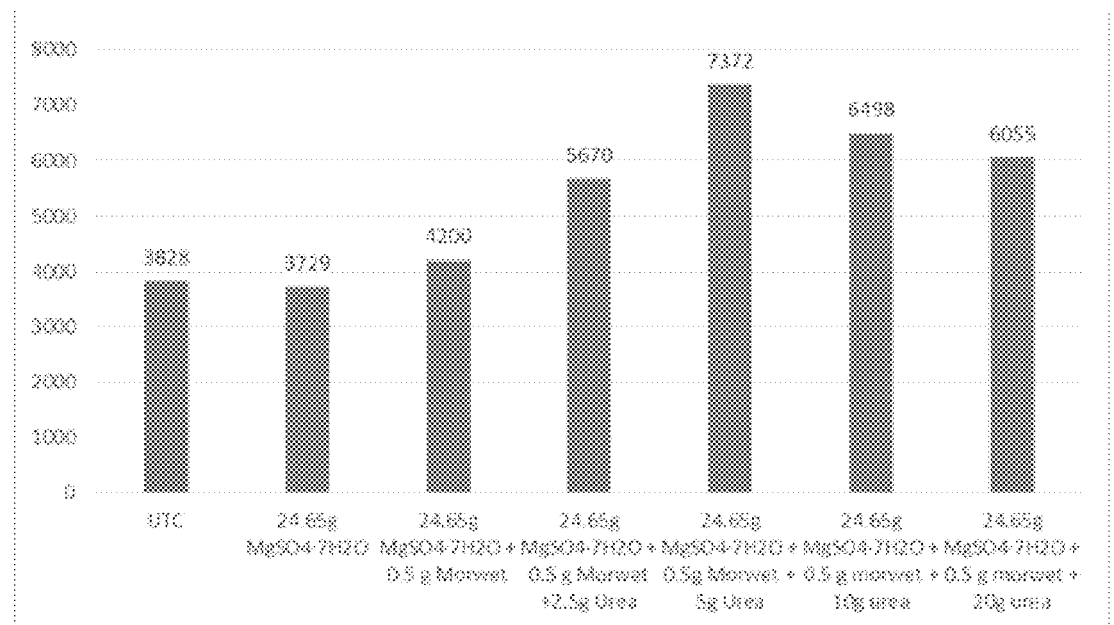
FIG. 4 is a bar graph showing the effect of different concentrations of urea on uptake of foliar applied magnesium sulphate into peppers.

As can be seen in FIG. 4, column 1 is an untreated control which had 3828 ppm of magnesium. Column 2 represents application of a solution of $MgSO_4 \cdot 7H_2O$ (24.65 g) which showed a slight reduction in magnesium translocation compared to column 1 (3729 ppm compared to 3828 ppm). In column 3, 0.5 g alkylnaphthalene sulfonate surfactant (MORWET®), was added, leading to an increase from 3729 ppm (column 2) to 4208 ppm (column 3), an increase of approximately 12%. In column 4, addition of 2.5 g urea resulted in an increase from 4208 ppm (column 3, no urea) to 5670 ppm (column 4), an increase of approximately 34%. In column 5, doubling the amount of urea resulted in an increase from 5670 (2.5 g urea) to 7372 (10 g urea), an increase of approximately 30%. However, increasing the urea to 10 g (column 6) resulted in a decrease from 7372 to 6498, a decrease of approximately 13%. Increasing urea to 20 g (column 7) resulted in a further decrease compared to column 6 (6055 ppm versus 6498 ppm) of approximately 7%. Thus, as can be seen, at least in this instance, there is a point at which addition of urea does not result in an increase in translocation.

As will be appreciated by one of skill in the art, this demonstrates that in the parts of the plant that have not been sprayed (i.e. new tissue that grows in the days following the spraying operation), adding a combination of (1) "point of deliquescence" (POD alkylnaphthalene sulfonate surfactant (MORWET®),) enhancer plus (2) an ingredient that will incite the plant to translocate the nutrient (Urea) enhances nutrition in the whole plant.

Example 5

Iron Sulphate Uptake in Corn

Corn plants were grown in pots in a greenhouse. When they were at approximately the 3 leaf stage, the newest 2 to 3 fully expanded leaves were marked at right angles to the midvein with a felt pen. The tips were immersed for 5 seconds in a solution comprising iron sulphate or a solution comprising iron sulphate and a PODadj agent. At 7 days post immersion, the tissues were clipped at the felt pen line and the tissue that had been immersed was measured for uptake of iron into the leaf tissue.

Figure 5:
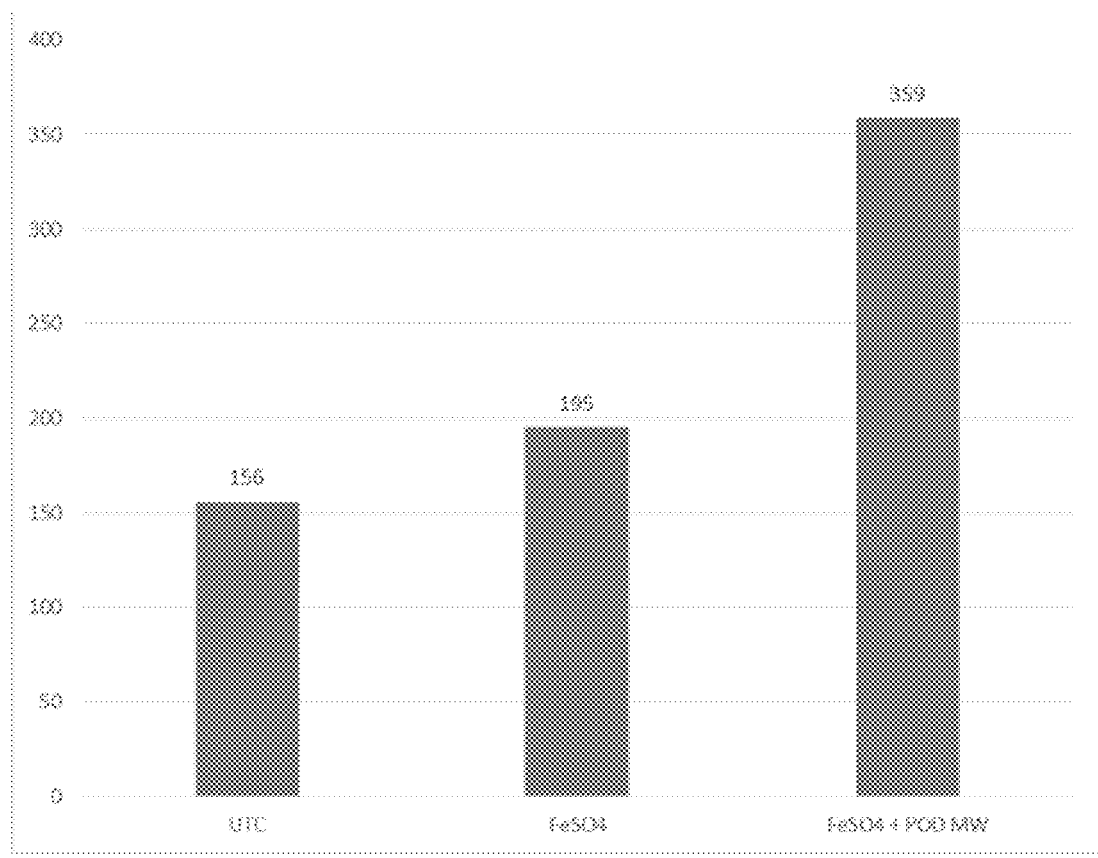
FIG. 5 is a bar graph showing the effect of addition of a PODadj compound on iron sulphate uptake in corn plants.

As can be seen in FIG. 5, an untreated control contained 156 ppm of iron (column 1). The leaf dipped in the iron sulphate solution had 195 ppm iron, an increase of approximately 25%. However, addition of the POD adjuster or enhancer, an alkylnaphthalene sulfonate surfactant (MORWET®), (column 3) resulted in 359 ppm, an increase of 84% compared to iron sulphate only and an increase of 130% over the untreated control.

This demonstrates that the addition of the POD adjuster compound increases the amount of iron sulphate uptake in the leaf tissue that has been treated with the solution.

Example 6

Iron Sulphate Translocation in Corn

Corn plants were grown in pots in a greenhouse. When they were at approximately the 3 leaf stage, the newest 2 to 3 fully expanded leaves were marked at right angles to the midvein with a felt pen. The tips were immersed for 5 seconds in a solution comprising iron sulphate or a solution comprising iron sulphate and various combinations of agents that will (a) lengthen the amount of time that the solution stays wet on the leaf surface or (b) assist in moving the iron out of the dipped tissue area and into new growth. At 7 days after immersion, tissue that had grown after the plant had been exposed to the iron sulphate solution was clipped to see if the combination of urea as a translocator and an alkylnaphthalene sulfonate surfactant (MORWET®), as a POD adjuster would promote translocating iron to new growth.

Figure 6:
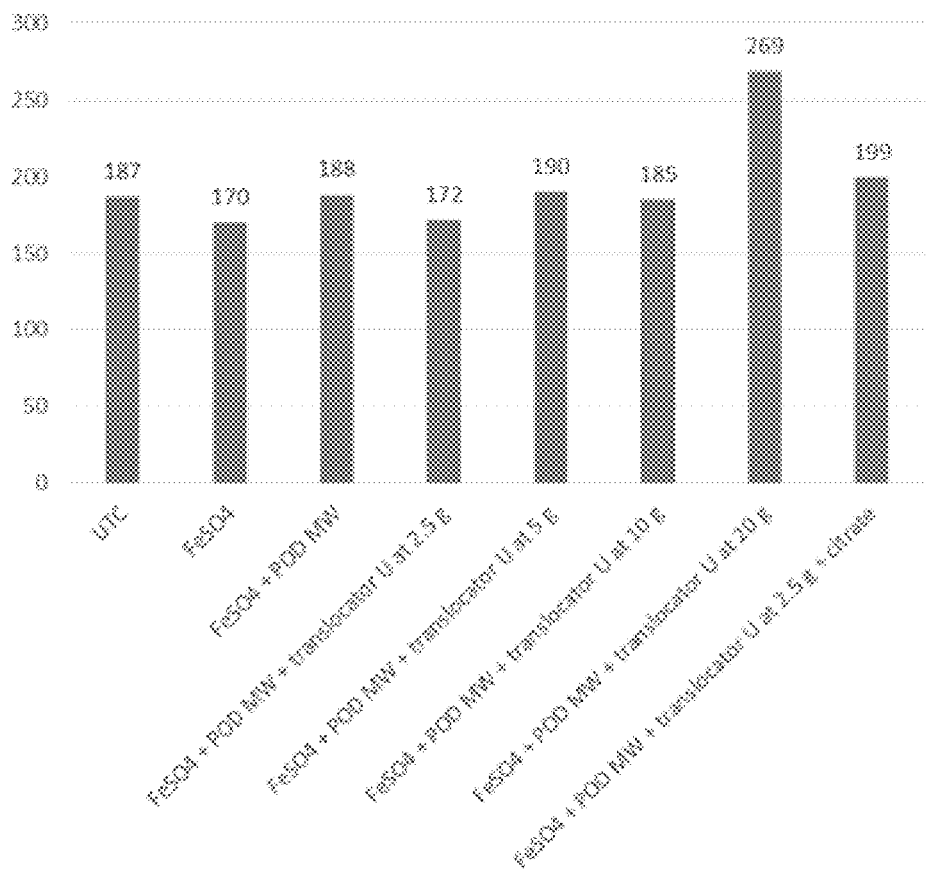
FIG. 6 is a bar graph showing the effect of varying concentrations of translocator compounds on iron sulphate uptake in corn.

As can be seen in FIG. 6, an untreated control had 187 ppm of iron (column 1). Leaf tissue from a plant exposed to iron sulphate had only 170 ppm (column 2), a decrease of approximately 9% compared to column 1. In column 3, the addition of Morwet returned the iron levels to approximately the same as the untreated control. In column 4, addition of 2.5 g of urea reduced the amount of iron to 172 ppm. In column 5, addition of 5 g of urea resulted in 190 ppm iron. In column 6, 10 g urea resulted in 185 ppm of iron. In column 7, addition of 20 g urea resulted in a significant increase to 269 ppm, an increase of 59% compared to iron sulphate and alkylnaphthalene sulfonate surfactant (MORWET®) alone (column 3). In column 8, 2.5 g urea and 1 percent citrate were added which resulted in 199 ppm, an increase of approximately 16% compared to column 4 (no citrate).

As can be seen, in this example, citrate has an additive effect on the translocation of the iron as more iron is incorporated into the plant compared to addition of the same amount of urea in column 4.

This indicates that in the parts of the plant that have not been sprayed (i.e. new tissue that grew in the days following the spraying operation)—adding a combination of (1) "point of deliquescence" enhancer plus (2) a translocator that promotes delivery of the nutrient throughout the plant which in turn enhances nutrition in the whole plant.

Example 7

Translocation of Iron Sulphate in Tomatoes

Tomato plants were grown in pots in a greenhouse. When they were approximately 6 inches high, the newest 2 to 3 fully expanded leaves were immersed for 5 seconds in a solution comprising iron sulphate or in a solution comprising iron sulphate and a POD adjuster plus urea as a translocator. At 7 days after immersion, the tissues were clipped so that only tissue that had grown since the immersion was analyzed.

Figure 7:
FIG. 7 is a bar graph showing the effect of different translocators on iron sulphate uptake in tomatoes.

As can be seen in FIG. 7, the untreated control (column 1) had 1221.4 ppm of iron uptake. In column 2, the plant treated with iron sulphate had 1337.91 ppm, an increase of approximately 9%. In column 3, the addition of 0.5 g alkylnaphthalene sulfonate surfactant (MORWET®), and 5 g urea resulted in 1465.08 ppm of iron, an increase of 9%. However, the addition of 5 g citrate (column 4) resulted in only 752.7 ppm of iron, a decrease of 49% compared to column 3.

This demonstrates that the addition of a "point of deliquescence" adjusting compound and a translocation enhancer increases the amount of movement of iron into new growth that has not been sprayed.

While not wishing to be bound to a particular theory or hypothesis, it is believed that addition of citrate (a traditional chelator) appears to increase the size of the molecule so that translocation of the iron is decreased.

As noted above, this is not a problem during zinc uptake in lettuce or iron uptake in corn but is an issue during iron uptake in tomatoes. As discussed above, it is believed that the citrate may form a complex with the metal ion, for example, zinc citrate or iron citrate, which is more difficult for the plant to translocate. Accordingly, care must be taken when selecting POD compounds or other additives to the foliar fertilizer so that compounds which may complex with the metal ions are not selected.

Example 8

Copper Uptake in Tomatoes

Tomato plants were grown in pots in a greenhouse. When they were approximately 6 inches, the newest 2 to 3 fully expanded leaves were immersed for 5 seconds in a solution comprising copper sulphate or comprising copper sulphate plus a POD adjusting compound. At 7 days post immersion, the tissues were clipped at the felt tip line and the tissue that had been immersed was measured for uptake of copper into the leaf tissue.

Figure 8:
FIG. 8 is a bar graph showing the effect of a PODadj compound on copper sulphate uptake in tomatoes.

As can be seen in FIG. 8, the untreated control (column 1) showed 55.25 ppm copper. However, the tissue immersed in the copper solution had 2377.25 ppm copper (column 2). Addition of 0.5 g alkylnaphthalene sulfonate surfactant (MORWET®), resulted in 3680.61 ppm (column 3), an increase of 55%.

Example 9

Copper Translocation in Wheat

Figure 9:
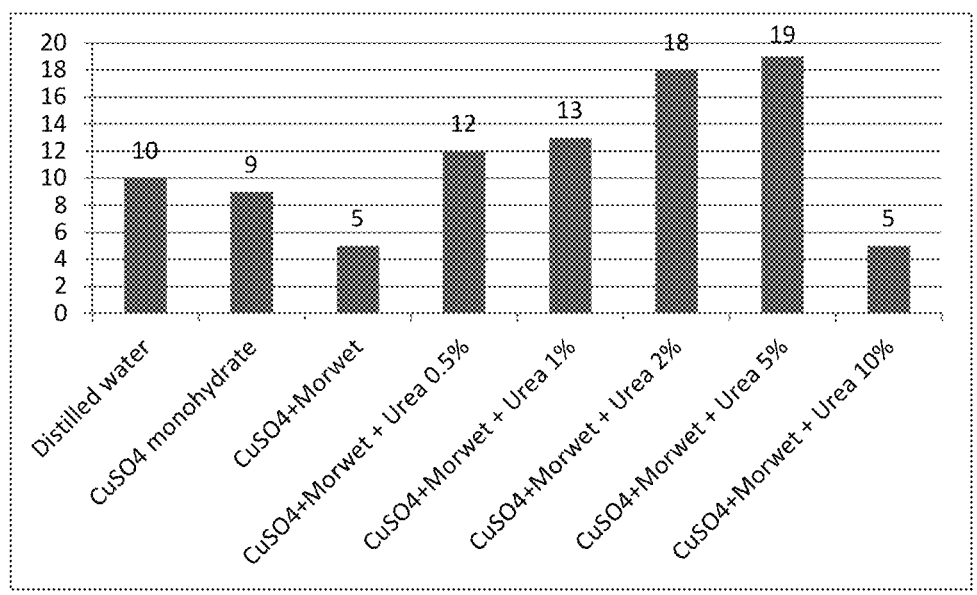
FIG. 9 is a bar graph showing the effect of varying concentrations of urea on copper sulphate uptake in wheat.

IAs can be seen in FIG. 9, the untreated control (column 1) had 10 ppm of copper. Column 2 from the plant from the leaf that was immersed in copper sulphate monohydrate had 9 ppm (column 2). In column 3, addition of alkylnaphthalene sulfonate surfactant (MORWET®), resulted in 5 ppm copper. In column 4, the addition of 0.5 g urea resulted in 12 ppm. In column 5, addition of 1 g of urea resulted in 13 ppm copper. In column 6, 2 g of urea resulted in 18 ppm of copper, an increase of 50% over column 4 (0.5 g urea) and an increase of 260% over column 3 (no urea). In column 7, 5 g urea resulted in only a moderate increase in copper translocation, 19 ppm. In column 8, addition of 10 g urea resulted in 5 ppm copper, similar to column 3 in which no urea was added.

The scope of the claims should not be limited by the preferred embodiments set forth in the examples but should be given the broadest interpretation consistent with the description as a whole.

What is claimed is:

1. A foliar metal ion nutrient fertilizer, comprising:
   from about 73% to about 99.6% (v/v) of a metal ion sulphate nutrient wherein the metal ion is selected from the group consisting of zinc, iron, copper and magnesium;
   from about 0.25% to about 25% (v/v) of urea transport enhancer; and
   from about 0.1% to about 2.5% (v/v) of a POD adjuster selected from the group consisting of organic surfactants, calcium chloride and magnesium chloride.

2. The foliar fertilizer of claim 1 wherein the amount of urea transport enhancer is from about 0.5% to about 2.5% (v/v).

3. The foliar fertilizer of claim 1 wherein the amount of POD adjuster is from about 0.5% to 1.5% (v/v).

4. The foliar fertilizer of claim 1 wherein the organic surfactants are non-ionic surfactants.

5. The foliar fertilizer of claim 4 wherein the non-ionic surfactants are selected from the group consisting of alkyl naphthalene sulfonates, ethoxylated alcohols, nonyl phenoxy polyethoxy ethanol, and amine alkoxylate.

6. The foliar fertilizer of claim 1 wherein the POD adjuster has a POD of 40 or below.

7. A method of enhancing metal ion uptake in a plant in need thereof comprising:
   applying a foliar metal ion nutrient fertilizer wherein the metal ion nutrient is from about 73% to about 99.6% (v/v) of said nutrient and said metal ion nutrient is selected from the group consisting of zinc sulphate, iron sulphate, copper sulfate and magnesium sulphate in combination with urea at from about 0.25% to about 25% (v/v) and a point of deliquescence (POD) adjusting compound with a suitable POD at from about 0.1% to about 2.5% (v/v); and
   growing the plant under conditions for promoting growth of said plant.

8. The method according to claim 7 wherein the POD adjusting compound is selected from the group consisting of organic surfactants, calcium chloride and magnesium chloride.

9. The method according to claim 7 wherein the suitable POD adjusting compound has a point of deliquescence below an average ambient humidity for the region of application.

10. The method according to claim 7 wherein the POD adjusting compound is at an amount of from about 0.5% to about 1.5% (v/v).

11. The method according to claim 7 wherein the urea is at from about 0.5% to about 2.5% (v/v).

12. The process of claim 7 wherein the metal is zinc.

13. The process of claim 7 wherein the metal is iron.

14. The process of claim 7 wherein the metal s copper.

15. The process of claim 7 wherein the metal is magnesium.

16. The process of claim 7 wherein the POD adjusting compound has a POD that is lower than the environmental humidity at the time of application and u